(12) United States Patent
Humphrey

(10) Patent No.: US 7,075,935 B1
(45) Date of Patent: Jul. 11, 2006

(54) ENGINEERING OPERATIONS CHANNEL PROVISION

(75) Inventor: Leslie Derek Humphrey, Old Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/257,223

(22) Filed: Feb. 25, 1999

(30) Foreign Application Priority Data

Feb. 27, 1998 (GB) ................... 9804303.7

(51) Int. Cl.
*H04L 12/56* (2006.01)

(52) U.S. Cl. .................... 370/395.6; 370/474

(58) Field of Classification Search ............ 370/395.1, 370/395.6, 395.61, 420, 473, 474
See application file for complete search history.

(56) References Cited

U.S. PATENT DOCUMENTS

| | | | |
|---|---|---|---|
| 5,138,615 A * | 8/1992 | Lamport et al. ............ 370/400 |
| 5,541,917 A * | 7/1996 | Farris ........................ 370/352 |
| 5,812,786 A * | 9/1998 | Seazholtz et al. ............ 709/233 |
| 5,936,963 A * | 8/1999 | Saussy ........................ 370/447 |
| 6,041,054 A * | 3/2000 | Westberg ................... 370/474 |
| 6,052,386 A * | 4/2000 | Achilleoudis et al. ...... 370/474 |
| 6,208,637 B1 * | 3/2001 | Eames ........................ 370/352 |
| 6,219,339 B1 * | 4/2001 | Doshi et al. ................ 370/235 |
| 6,243,394 B1 * | 6/2001 | Deng ......................... 370/474 |
| 6,314,102 B1 * | 11/2001 | Czerwiec et al. ........ 370/395.6 |
| 6,396,853 B1 * | 5/2002 | Humphrey et al. ......... 370/474 |
| 6,449,276 B1 * | 9/2002 | Subbiah et al. .......... 370/395.6 |

FOREIGN PATENT DOCUMENTS

| | | |
|---|---|---|
| GB | 2320396 | 6/1998 |
| WO | 97/48251 | 12/1997 |
| WO | 98/18288 | 4/1998 |

* cited by examiner

*Primary Examiner*—Derrick Ferris
(74) *Attorney, Agent, or Firm*—Barnes & Thornburg, LLP

(57) ABSTRACT

A VDSL service is provided to a subscriber over a twisted pair loop. An engineering operations channel (EOC) providing control functions is carried in AAL2 minicells. This facilitates multiplexing of messages associated with various network management layers over the EOC.

18 Claims, 6 Drawing Sheets

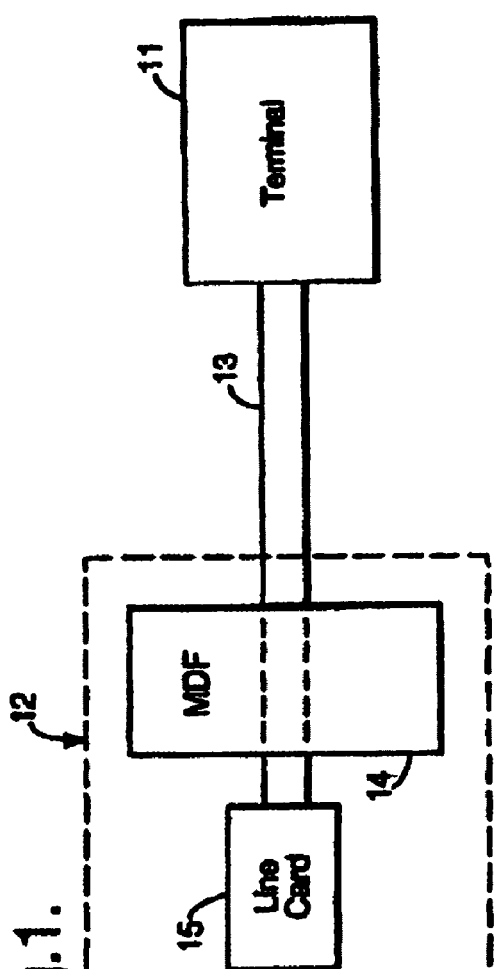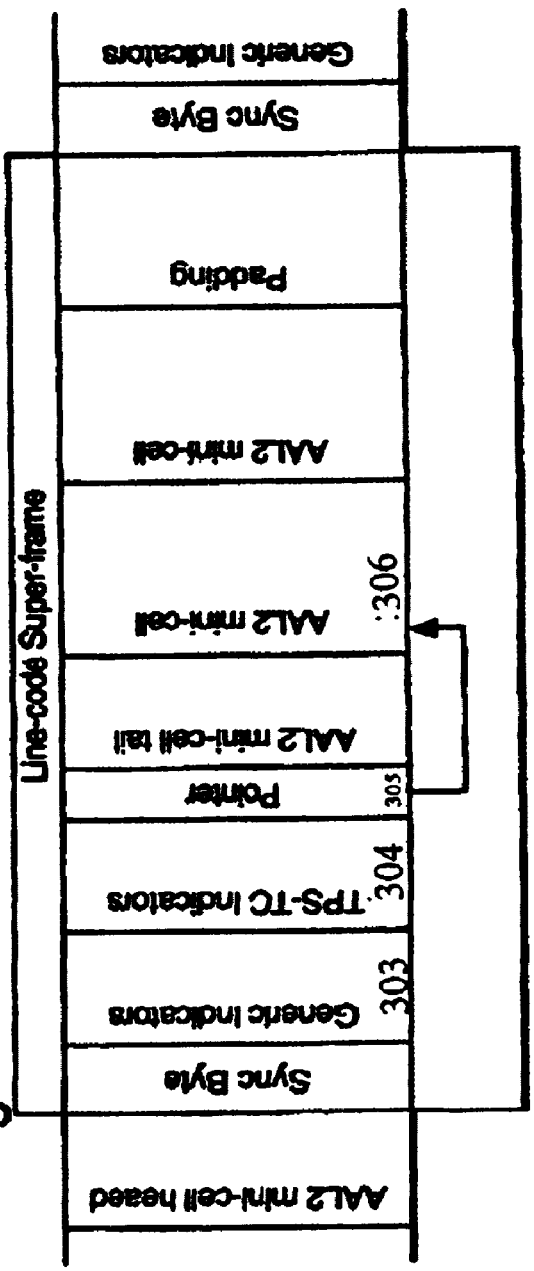

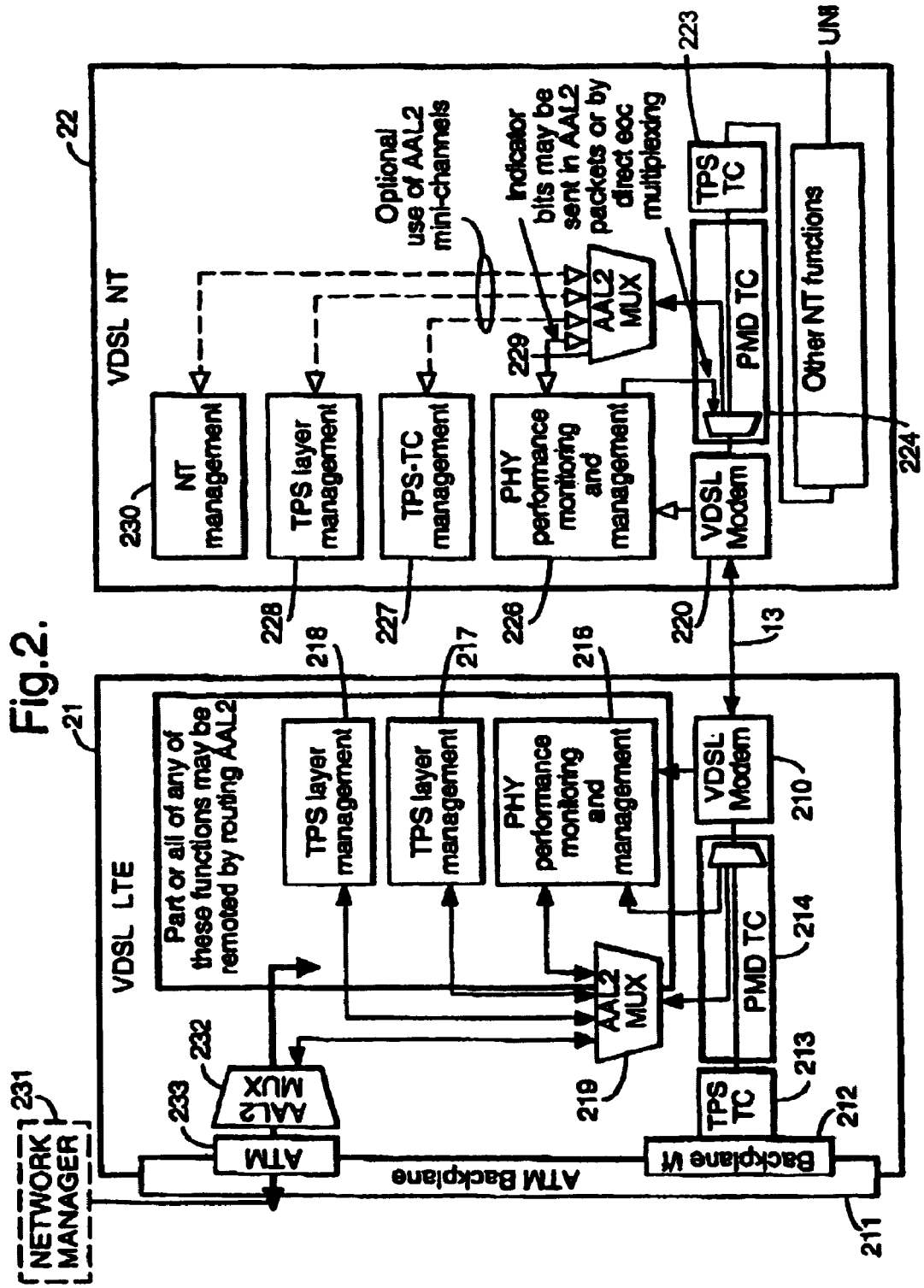

Fig.5.

501 Register Access
| 1100 00RR=Long |
| Message Number=1 Byte |
| Optional Line ID=1 Byte |
| Register ID=1 Byte |
| Payload LI-4-Bytes (LI-5 for line ID option) RR=11 for read RR=00 for write |
| CRC=1 Byte |

502 Register Ack
| 1111 00RR=Acknowledge |
| Message Number=1 Byte |
| Optional Line ID=1 Byte |
| Register ID=1 Byte |
| Payload LI-4-Bytes (LI-5 for line ID option) RR=11 for read RR=00 for write |
| CRC=1 Byte |

503 Short
| 0000 | OPcode=4bits |
| CRC=1 Byte |

504 Short With Indicators
| 00110000=short+I |
| Indicators A=1 Byte |
| Indicators B=1 Byte |
| CRC=1 Byte |

Example Opcodes
0 not used
1 cold restart
2 warm restart
3 self-test 192 (11000000)Register write
195 (11000011)Register read
048 (00110000)Acknowledge
240 (11110000)Register write Acknowledge
243 (11110011)Register read Acknowledge Synchronous Pleisochronous

ENGINEERING OPERATIONS CHANNEL PROVISION

This invention relates to arrangements and methods for providing an engineering operations channel (EOC) in association with digital services delivered to a user terminal.

BACKGROUND OF THE INVENTION

In a conventional telephone system, the majority of subscribers are connected to local exchanges via twisted conductor pairs, generally referred to as subscriber loops. Between the subscribers and the exchange, the subscriber loops are carried in cables each containing a large number of conductor pairs. The cables from the exchange feed smaller street cables from which the individual subscriber loops are 'dropped' to provide the final link to the subscriber. These twisted pair subscriber loops, which were originally installed to carry voice services, are now being used by the system operators to carry new services such as ADSL (asymmetric digital subscriber line) in the frequency spectrum above the base band frequencies used for the voice or POTS traffic. These services are added to the subscriber line at the exchange and may carry e.g. video and/or Internet traffic to the subscriber.

The currently employed ADSL service is a broad band technology which occupies a frequency band above that of voice to provide high bit rate (asymmetric) services to customers. Typically this service uses discrete multi-tone technology (DMT) at frequencies of about 20 to 100 kHz up to about 1.1 MHz at a downstream bit rate of 2 Mb/s and at an upstream bit rate of 200 kb/s. The ADSL service is usually delivered via a carrier based system using discrete multi-tone (DMT) in which the traffic is carried on a number of frequencies over the twisted pair to the subscriber.

There are now proposals to introduce a new higher bit rate interactive or symmetric service generally referred to as VDSL (very high bit rate digital subscriber line). This service is intended primarily for business customers to carry large volumes of data traffic to and from such customers. For most users the service will be provided over an existing twisted pair subscriber loop or link coupling that user's terminal to a local exchange so as to avoid the cost of installing e.g. a coaxial link to the subscriber.

A particular problem with the introduction of VDSL systems is that of managing and controlling the subscriber link to allow remote status and performance monitoring of the link and to perform management operations which require downloading of information and commands. A further requirement is that of providing synchronisation between the transmitters and receivers at the exchange and subscriber ends of the links. This synchronisation of transmitter and receiver is essential where the digital data transmitted over the link has been scrambled to provide an even distribution of binary ones and zeros.

In a conventional e.g. ADSL system, an engineering operations channel is provided by the allocation of bits, often byte oriented, in each superframe structure of a transmission line-code. This provides the transport of a set of so-called indicator bits and control messages.

Currently employed EOC arrangements suffer from the disadvantage that they are protocol specific and thus lack flexibility. In an attempt to reduce this problem, there have been proposals for inserting EOC information into an ATM channel. This has the advantage of common cell processing, but the need to accommodate fixed length cells has limited the efficiency of the technique.

SUMMARY OF THE INVENTION

An object of the invention is to minimise or to overcome the above disadvantage.

A further object of the invention is to provide an improved engineering operations channel arrangement and method for use in a VDSL system.

A further object of the invention is to provide an improved method of managing a subscriber link between a VDSL customer and an exchange.

A further object of the invention is to provide an improved digital communication service.

According to a first aspect of the invention there is provided a method of transporting digital traffic over a line from a central station to a subscriber terminal, the method comprising providing an engineering operations channel over the line, wherein said engineering operations channel is transported in asynchronous minicells.

According to a further aspect of the invention there is provided a method of providing a digital communication service over a line from a line termination equipment disposed at a central station to a subscriber terminal, the method comprising providing a engineering operations channel for effecting control and management of the subscriber terminal, and transporting said engineering operations channel in a sequence of asynchronous minicells over the line.

According to a further aspect of the invention there is provided apparatus for providing a digital communication service over a line from a line termination equipment disposed at a central station to a subscriber terminal, wherein the line termination equipment and the subscriber terminal incorporate respective first and second management systems arranged to control and supervise said digital communication service via messaging therebetween carried in an engineering operations channel over the line, and wherein the line termination equipment and the subscriber terminal incorporate means for providing said engineering operations channel in the form of a sequence of asynchronous minicells over the line.

According to a further aspect of the invention there is provided a digital communications system, comprising a subscriber network termination, a line termination equipment, and a transmission path therebetween, the subscriber termination and the line termination being coupled to the path via respective first and second modems, wherein the subscriber termination and the line termination each incorporate respectively a first and second management system each system consisting of a corresponding plurality of management levels, said first and second management systems being arranged to control and supervise said digital communication service via messaging carried in an engineering operations channel over the line, wherein said subscriber termination and the line termination each incorporate respective multiplexer means interfacing with the management levels of that termination, and wherein said subscriber termination and line termination incorporate respective packet transaction means each interfacing with the respective multiplexer means for carrying messaging between corresponding subscriber termination and line termination management levels in an engineering operations channel over the line, said engineering operations channel being comprised by a sequence of asynchronous minicells over the line.

According to a further aspect of the invention there is provided a method of controlling digital communications system comprising a subscriber network termination, a line termination equipment, and a transmission path therebetween, the subscriber termination and the line termination each incorporating respectively a first and second management system each system consisting of a corresponding plurality of management levels, said first and second management systems being arranged to control and supervise said digital communication service, the method comprising providing messaging paths between corresponding management levels, and multiplexing said messaging paths into an engineering operations channel over the line, and wherein said engineering operations channel is transported in a sequence of asynchronous minicells over the line.

In a further aspect the invention provides a digital subscriber network termination for receiving a digital service over a subscriber line coupled thereto, the subscriber termination including a management system consisting of a plurality of management levels, said first and second management system being arranged to control and supervise said digital communication service via messaging carried in an engineering operations channel over the line, multiplexer means interfacing with the management levels of the subscriber termination, and packet transaction means interfacing with the multiplexer means for carrying messaging to and from the management levels in an engineering operations channel over the line, said engineering operations channel being comprised by a sequence of asynchronous minicells over the line.

The technique provides the advantage of cell based transport without the constraint of fixed length cells and their associated assembly delay. Further, by carrying the EOC channel in minicells, this channel is rendered wholly independent of the protocol or protocols employed for VDSL transport.

In a preferred embodiment, spare capacity in the EOC channel may be used to accommodate low delay telephony traffic e.g. to provide a voice over Internet service.

The minicells transporting the EOC channel may be of variable length, the start of each cell being determined by the use of pointers and/or a length indicator (LI) field.

BRIEF DESCRIPTION OF THE DRAWINGS

Embodiments of the invention will now be described with reference to the accompanying drawings in which:—

FIG. 1 is a schematic diagram showing a VDSL subscriber terminal coupled to a local exchange via a subscriber link;

FIG. 2 shows the exchange and subscriber terminal equipment used in the arrangement of FIG. 1;

FIG. 3 illustrates a first method of providing an engineering operations channel over the subscriber link of FIG. 1;

FIG. 5 shows a register access messaging scheme for use with the EOC provision of FIG. 4;

DESCRIPTION OF PREFERRED EMBODIMENTS

Figure 4:
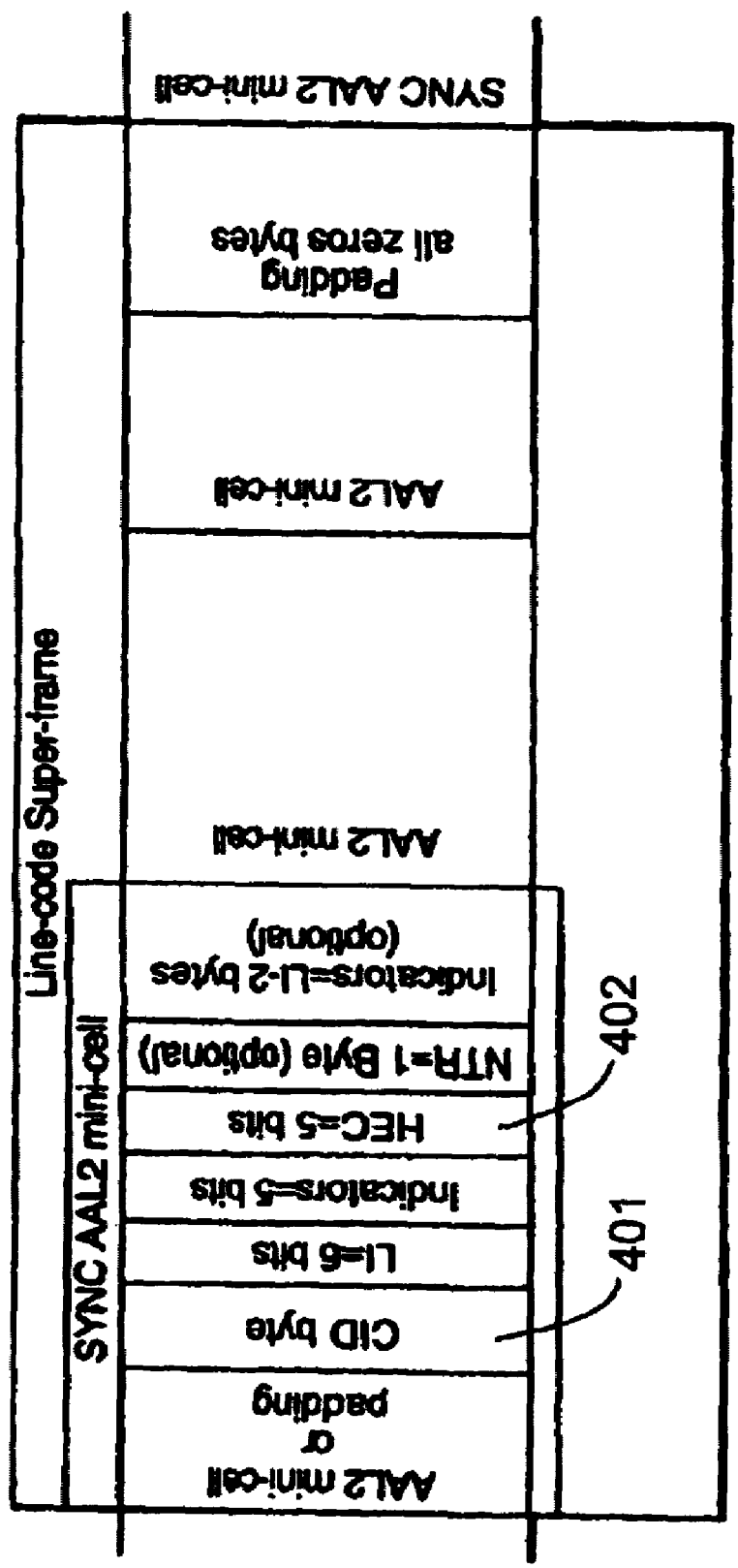
FIG. 4 illustrates a modification of the EOC provision of FIG. 3.

Referring first to FIG. 1, this illustrates in schematic form the connection of a VDSL user terminal 11 to an exchange, generally indicated as 12, via a subscriber loop 13. Typically, the subscriber loop 13 will be terminated on a main distribution frame (MDF) 14 at the exchange and will be coupled thereby to a VDSL line card 15. The line card 15 is in turn coupled to a switch (not shown) whereby VDSL traffic may be routed to and from the subscriber terminal 11. Typically the VDSL traffic over the subscriber loop in both the upstream and downstream directions is carried in a frequency band above 1.2 MHz.

FIG. 2 shows the exchange or line terminating equipment (LTE) 21 and the subscriber or network termination (NT) 22 that may be employed in the provision of the VDSL service to the subscriber. The LTE 21 and the NT 22 are each coupled to the subscriber line 13 via a respective modem 210 and 220.

The line terminating equipment performs the function of a line card for the VDSL service and is coupled to an ATM backplane 211 via an interface 212, a transaction protocol specific (TPS) transaction conveyance (TC) function 213 and a packet mode data (PMD) transaction conveyance (TC) function 214. It will be understood that a number of similar line termination equipments, one for each VDSL subscriber, will be coupled to the backplane 211. The network termination modem 220 is similarly coupled to the user network interface (UNI) via a transaction protocol specific (TPS) transaction conveyance (TC) function 223 and a packet mode data (PMD) transaction conveyance (TC) function 224.

Control of the line terminating equipment and the network terminating equipment is provided by a number of management layers. At the lowest level, a physical performance monitoring and management layer 216, 226 monitors modem performance and provides a transmission convergence functionality. This layer is independent of transmission protocols. The next level is a transport protocol specific (TPS) transaction conveyance management layer convergence layer 217, 227. This layer is associated with ATM protocols, management and performance monitoring. The highest level comprises a transport protocol specific (TPS) management layer 218,228 providing e.g. traffic shaping and system level functions. Communication between the corresponding management layers in the line termination and the network termination is effected via AAL2 multiplexers 219, 229, this management communication traffic being carried in the EOC channel over the subscriber line. Optionally, this management traffic may be carried in AAL2 minichannels. Indicator bits relating to the PHY performance monitoring and management may be sent in AAL2 packets or may be sent by direct EOC multiplexing.

The network termination incorporates a further NT management level 230 that communicates with a remote network manager 231 via a further AAL2 multiplexer 232 and an ATM interface 233 disposed in the line termination equipment 21.

In the arrangement of FIGS. 1 and 2, traffic is transported over the subscriber loop in asynchronous minicells. The engineering operations channel (EOC) is framed and byte oriented, one EOC frame being equivalent to one line-code super-frame 301, the frame structure being illustrated in FIG. 3. The EOC channel contains a number information elements, these principally comprising a super-frame synchronisation pattern 302, generic indicator bits 303, transport protocol indicator bits 304 and EOC messages. The format of the EOC messages is that of the AAL2 common part sub-layer packets defined in the ITU draft recommendation 1363.2 the content of which is incorporated herein by reference. The EOC message format further incorporates a special service specific convergence sub-layer defined for VDSL physical layer EOC applications.

The first byte of the EOC message field comprises a six bit pointer 305, a sequence number bit and parity bits. The pointer identifies the start of the first valid mini-cell in the EOC frame. The EOC message field is followed by minicells 306 which are packed into ATM cells as defined by the AAL2 protocol.

In a modification of the technique illustrated in FIG. 4, the EOC synchronisation pattern is provided by the header of an AAL2 common port sublayer (CPS) packet with a special channel identifier (CID) 401 which contains as payload the indicator bits as defined above. In this embodiment, delineation of super-frame boundaries is based on the known super-frame length and consequently on the known periodic arrival of valid CPS-packet header error control (HEC) bits 402. Initial delineation may be implied by the link start-up process, or may be subsequently re-established by hunting for a number of correct HEC determinations and detection of the unique CID on predicted superframe boundaries. Further, loss of super-frame delineation may be detected by detection of a predetermined number of HEC failures in a given period. Control of the super-frame delineation process can be modelled on the state-machine used for ATM cell delineation.

The indicator bits are packed into a number of bytes of synchronisation packet payload or, if 5 bits are sufficient, can be mapped onto the AAL2 user to user information (UUI) field for this specific CID and are consequently protected by the HEC: Where carried in the payload, an additional checksum/parity byte may be added to protect the payload, or one or more bits of the UUI may be allocated as parity bits to provide the same function.

Any number of AAL2 CPS-packets may be included in a superframe, but padding bytes are inserted to ensure that superframe header synchronisation. Optionally network timing reference phase information can be carried in the mini-cell where the transport system clock is not synchronised to an NTR.

Where the user terminal is provided with a register, this may be used to store command and control information. Access to the register may be effected via the messaging scheme illustrated in FIG. 5. The scheme includes register access messages 501 to write information into and to read information from the register, and acknowledgement messages 502 which confirm to the exchange that a read and/or write instruction has been performed. The messaging scheme may also accommodate simple command messages that require no acknowledgement, e.g. a message reporting an imminent shut-down of transmission, by the use of a short message field 503. A further short message field 504 provides for the insertion of indicators as required.

EOC messages can be directed to the appropriate remote functional entity by using the mini-cell CID as a discriminator. Alternatively the SSCS (service specific convergence sublayer) definition can provide the same function, leaving the CID available as the primary line identity discriminator.

e.g. 1) Mixed use of CID—7 functions per line of 31 lines maximum

COD 0000 0000 . . . 0000 0111 reserved for AAL2

CID 0000 1000 . . . 000 1111 for line 1 functions 0 . . . 7.

CID 11111 1000 . . . 0000 1111 for line 2 to 31

In a situation where several network line terminating equipments are co-located the mini-cells carrying EOC messages can be formed into a single AAL2 stream processed by common management functions. Some functions can be processed locally to the line modem functions, such as dealing with remote indicator bits for example, and other minicells onwards routed via a composite AAL2 mini-cell stream. The local functions can then also communicate with separate higher level management functions through the same AAL2 stream.

In a further embodiment, the AAL2 stream can be handled as a naked AAL2 data stream (also known as AL2 protocol) or it can be further encapsulated in ATM. This approach is particularly appropriate for ATM specific equipment which implements an ATM backplane. A single ATM VC is then used for carrying all the traffic from a single module/line-card to a common processing function located with the line cards/modules, for example in a remote optical network unit (ONU) or elsewhere in the network for example at a passive optical network head-end. Where network termination implements narrow-band voice on AAL2, the AAL2 processing blocks can be shared with the EOC channel. This cannot be extended so that if the bandwidth of the EOC channel is expanded then multiple narrow-band ISDN channels and IP/PPP data can be multiplexed with the EOC information on the same bearer channel.

Figure 6A:
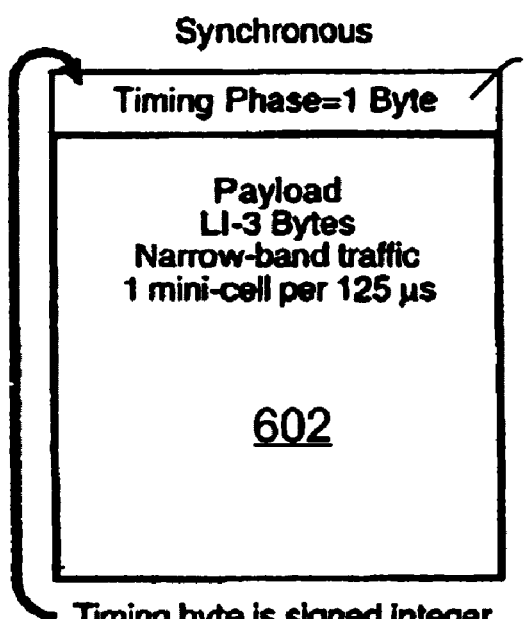
FIGS. 6a and 6b illustrate a service specific common sublayer (SSCS) for synchronous and plesiochronous traffic respectively.
Figure 6B:
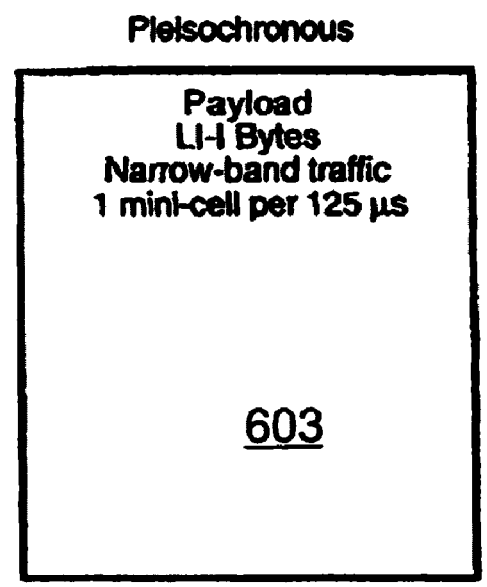
Figure 7:
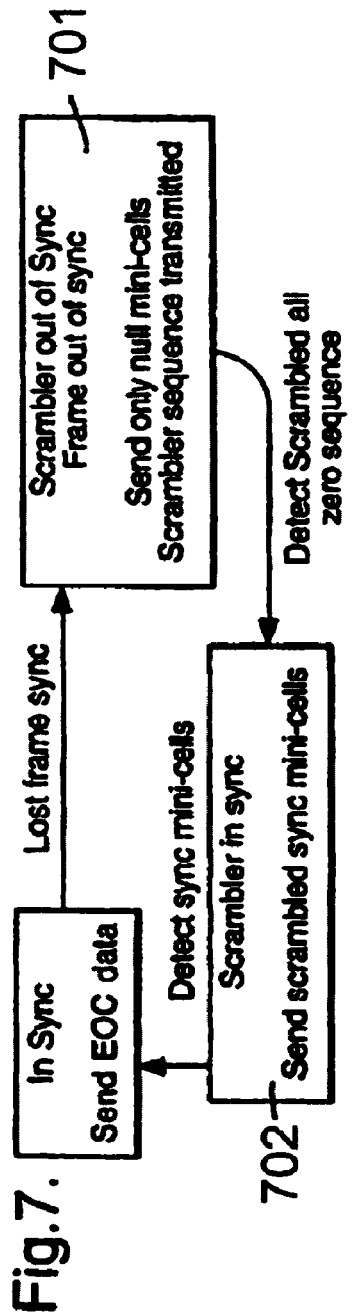
FIG. 7 illustrates a method of scrambler synchronisation in the arrangement of FIGS. 1 and 2.

An alternative method for transporting Narrow-band traffic 602, 603 is by the use of circuit emulation in which an SSCS based ATM AAL1 with time stamps relies on transport of the NTR by the transport system (carried for example as a phase stamp in the synchronisation mini-cell); or by plesiochronous multiplexing of null encapsulated narrow band traffic with autonomous timing recovery. This is illustrated in FIG. 6a which refers to synchronous transport and FIG. 6b which refers to plesiochronous transport. For synchronous transport (FIG. 6a) the timing byte 601 is a signed integer giving the offset from the NTR phase. It is also possible to use two bytes each for the NTR phase and user timing phase.

Where the EOC mini-cell is synchronised, a maximal length pseudo random binary sequence (PRBS) may be added modulo two to the channel data viewed as a bit stream where each byte is transmitted MSB first. This provides scrambling which randomises the data stream to minimise narrow band RFI emissions and to prevent user simulation of valid mini-cell headers. The phase of the added sequence may be determined with the EOC superframe alignment at the receiver. This is described below with reference to FIG. 7 which is a block schematic flow chart defining the scrambler operation.

Synchronisation with the receiver is performed by sending null data until a synchronisation state is achieved 701, after which normal data can be sent over the link 702. The scheme is dependent on the fact that it is possible to detect an all zero data sequence before scrambling by testing the received sequence with the recurrence relation implied by the PRBS generator polynomial. The basis of the synchronisation scheme is co-operation between the two ends of the link, so that neither the synchronisation mini-cell nor any other mini-cell is transmitted unless the receiver at the same end indicates that its descrambler is in synchronisation. Essentially, the scrambler circuit performs a summation of the current bit sample with a running sum of previous samples occurring at integer multiples of n-bit offsets from the current sample to produce the scrambled output. The corresponding de-scrambler operates on the received signal to reverse the scrambling process by subtracting the current data sample from the previous data sample offset by the same n-bit positions.

In the state "Scrambler out of Sync Frame out of sync" 701 the receiver must detect at least one whole frame of null EOC traffic (no sync mini-cells) before entering the "Scrambler in sync" state 702.

The detection of scrambled all-zeros traffic (null EOC traffic) can be performed by polynomial multiplication utilising the transmit generator polynomial. A conventional feed-forward de-scrambler can perform this multiplication on a continuous basis and will produce continuous stream of all zero data starting N bits after the arrival of the first scrambled zero data bit where N is the order of the scrambler polynomial.

A free running scrambler must in any case be re-synchronised with the supposed scrambled null data sequence by loading that circuit with received data samples and checking that its output (prediction) is the same as the actual received sequence for at least N bits.

If multiplicative checking is used the synchronisation can be performed only once after the scrambled null sequence has been confirmed, but instead the free running scrambler could be designed to continuously attempt synchronisation on different scrambler phases until the predicted and received sequences are the same for the required period.

Figure 8:
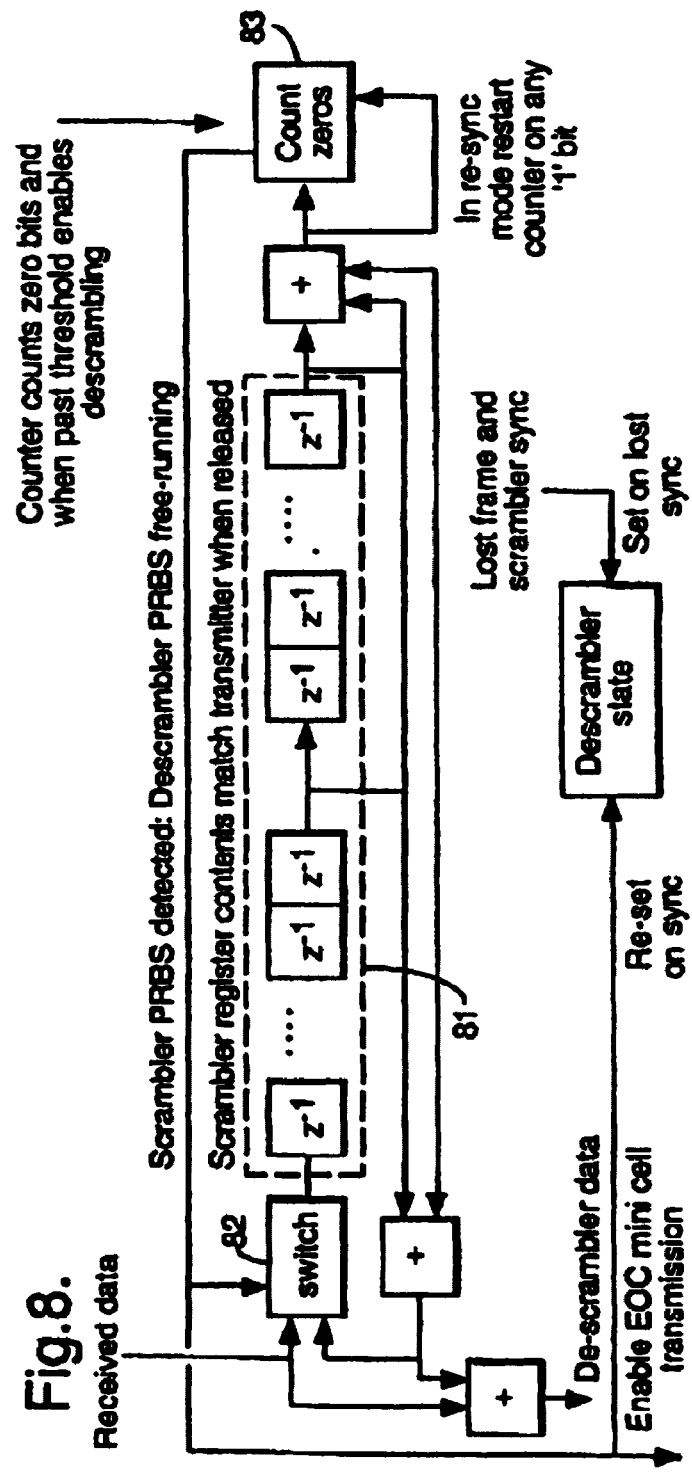
FIG. 8 illustrates a descrambler synchronisation arrangement for use with the scrambling process of FIG. 7.

Since the synchronisation process takes place when there are no user minicells on the link, there is no necessity for separate payload scrambling to prevent user imitation of synchronisation patterns as the minicell contents are ignored while the link is being synchronised. A suitable descrambler synchronisation arrangement is illustrated in FIG. 8. The construction and operation of this descrambler circuit will be familiar to those skilled in the art. Because scrambled null data is being transmitted during the synchronisation process, the corresponding descrambled sequence will also be a null sequence when synchronisation between transmitter and receiver is achieved. Blocks of incoming received data are loaded into the descrambler register 81, the switch 82 is then opened and the scrambled sequence is descrambled by the register elements. A counter 83 determines the number of zeros in the register output and, when this count reaches a preset value indicative of synchronisation, enables the descrambling process for actual data.

The effective EOC frame length can be extended by incorporating user bytes, including FEC check bytes, which are ignored when processing or extracting the EOC minicells.

Where only EOC mini-cells are carried, the most significant bits of the CID field may be used to select the line for which the EOC mini-cell is intended. This field is available as an address field for the network terminal which is to be used as the most significant bits of the upstream CID number to be used. This identifies upstream mini-cells as to their source. Alternatively the most significant bits of the CID can be zeroed downstream and set to the line identity at the LTE upstream.

Where the EOC mini-cells are mixed with other AAL2 traffic a special CID range (as allocated for instance to line 1 in the above example) may be used to identify them. In the example CIDs 8 to 15 are used to identify EOC cells, and available CIDs for traffic start at 16.

Where super-framing is performed by the EOC mini-cell, indicator bits are only allowed to be transmitted one per super-frame in the synchronising mini-cell. Therefore the opcode range which indicates presence of indicator bits can be used as a super-frame sync marker. Optionally a register access field can be added to the sync mini-cell payload. At other times EOC mini-cells can contain simple EOC commands, or register access messages.

To ensure reliable transmission when the link itself is subject to significant bit errors and to minimize the probability of false EOC mini-cell reception, a special protocol may be applied to cells which are identifiable as EOC mini-cells from the CID range. It is assumed that all minicells are discarded if the HEC is found to be bad, and where an EOC mini-cell is used for super-frame synchronization.

EOC mini-cells requesting register write are accepted on receipt of a correct CRC and HEC, and are acknowledged by re-transmission backwards. EOC mini-cells requesting register read operation are accepted on receipt of a correct CRC and HEC, or if a time-out period is exceeded, the register access request is sent again with the same message number. The process is repeated until a good response is received, or on a long time out the EOC link failed is declared to the network management layer.

Advantageously, messages are numbered to allow overlapping of requests, although it may be desirable to send only one message at a time, waiting until each message is correctly acknowledged until sending the next. A register number is reserved for mini-cells which are immediately looped back unaltered for EOC path integrity testing.

It will be understood that the above description of preferred embodiments is given by way of example only and that various modifications may be made by those skilled in the art without departing from the spirit and scope of the invention.

The invention claimed is:

1. Apparatus for providing a point to point digital subscriber line communication service over a point to point subscriber line from a line termination equipment disposed at a central station to a subscriber terminal, wherein the line termination equipment and the subscriber terminal incorporate respective first and second management systems arranged to control and supervise said digital subscriber line communication service via messaging therebetween carried in an engineering operations channel over the line, and wherein the line termination equipment and the subscriber terminal incorporate multiplexer means for providing said engineering operations channel in the form of a sequence of ATM Adaptation Layer (AAL) minicells over the line, said engineering operations channel comprising a separate channel independent of any transport channels.

2. An apparatus as claimed in claim 1, wherein the AAL minicells are AAL2 minicells.

3. A digital communications system comprising: a subscriber network termination, a line termination equipment, and a point to point transmission path therebetween, the subscriber termination and the line termination being coupled to the path via respective first and second modems, wherein the subscriber termination and the line termination each incorporate respectively a first and second management system each system consisting of a corresponding plurality of management levels, said first and second management systems being arranged to control and supervise a digital subscriber line communication service via messaging carried in an engineering operations channel over the line, wherein said subscriber termination and the line termination each incorporate respective multiplexer means interfacing with the management levels of that termination, and wherein said subscriber termination and line termination incorporate respective packet transaction means each interfacing with the respective multiplexer means for carrying messaging between corresponding subscriber termination and line termination management levels in an engineering operations channel over the path, said engineering operations channel being comprised by a sequence of ATM Adaptation Layer (AAL) minicells over the path.

4. A digital communications system as claimed in claim 3, wherein the AAL minicells are AAL2 minicells.

5. A digital communication system as claimed in claim 3, wherein said subscriber termination and line termination each incorporate scrambling and descrambling means.

6. A digital communications system as claimed in claim 5, wherein said line termination equipment is coupled to an ATM backplane whereby the digital service is delivered.

7. A digital communications system as claimed in claim 6, wherein said line comprises a twisted conductor pair.

8. A digital subscriber network termination for receiving a point to point digital subscriber line service over a point to point subscriber line coupled thereto, the subscriber termination including a management system consisting of a plurality of management levels, said management system being arranged to control and supervise said digital subscriber line communication service via messaging carried in an engineering operations channel over the line, multiplexer means interfacing with the management levels of the subscriber termination, and packet transaction means interfacing with the multiplexer means for carrying messaging to and from the management levels in an engineering operations channel over the line, said engineering operations channel being comprised by a sequence of ATM Adaptation Layer (AAL) minicells over the line.

9. A digital subscriber network termination as claimed in claim 8, wherein the AAL minicells are AAL2 minicells.

10. A method of providing a digital subscriber line communication service over a digital subscriber link over a point to point line from a line termination equipment disposed at a central station to a subscriber terminal, the method comprising providing a engineering operations channel for effecting control and management of the subscriber terminal, and transporting said engineering operations channel in a sequence of ATM Adaptation Layer (AAL) minicells over the line, said engineering operations channel comprising a separate channel independent of any transport channels.

11. A method as claimed in claim 10, wherein packet voice traffic is carried in spare capacity in said engineering operations channel.

12. A method as claimed in claim 11, wherein the engineering operations channel is framed and byte oriented.

13. A method as claimed in claim 12, wherein the engineering operations channel is scrambled over the line.

14. A method as claimed in claim 13, wherein synchronisation between the central station and the subscriber terminal is performed during a period of transmission of null data on said engineering operations channel.

15. A method as claimed in claim 10, wherein the AAL minicells are AAL2 minicells.

16. A method of transporting digital subscriber line traffic over a digital subscriber link over a point to point line from a central station to a subscriber terminal, the method comprising providing an engineering operations channel over the line, wherein said engineering operations channel is transported over said line in ATM Adaptation Layer (AAL) minicells, said engineering operations channel being provided as a separate channel independent of an transport channels.

17. A method as claimed in claim 16, wherein the AAL minicells are AAL2 minicells.

18. A method of controlling a point to point digital subscriber line communications system comprising a subscriber network termination, a line termination equipment, and a point to point transmission path therebetween, the subscriber termination and the line termination each incorporating respectively a first and second management system each system consisting of a corresponding plurality of management levels, said first and second management systems being arranged to control and supervise said digital subscriber line communication service, the method comprising providing messaging paths between corresponding management levels, and multiplexing said messaging paths into an engineering operations channel over the line, wherein said engineering operations channel is transported in a sequence of ATM Adaptation Layer (AAL) minicells over the line.

* * * * *